United States Patent
Kai

(10) Patent No.: US 9,451,103 B2
(45) Date of Patent: Sep. 20, 2016

(54) PRINTING DEVICE, MOBILE TERMINAL, AND COMPUTER READABLE RECORDING MEDIUM FOR THE SAME

(71) Applicant: Takafumi Kai, Nagoya (JP)

(72) Inventor: Takafumi Kai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/228,317

(22) Filed: Mar. 28, 2014

(65) Prior Publication Data

US 2014/0293348 A1    Oct. 2, 2014

(30) Foreign Application Priority Data

Mar. 29, 2013   (JP) .................................. 2013-073552

(51) Int. Cl.
*G06F 3/12* (2006.01)
*H04N 1/00* (2006.01)
*G06K 15/00* (2006.01)

(52) U.S. Cl.
CPC ...... *H04N 1/00307* (2013.01); *H04N 1/00236* (2013.01); *H04N 1/0044* (2013.01); *H04N 1/00453* (2013.01); *H04N 1/00461* (2013.01); *H04N 2201/006* (2013.01); *H04N 2201/0013* (2013.01); *H04N 2201/0041* (2013.01); *H04N 2201/0082* (2013.01)

(58) Field of Classification Search
USPC ................................................. 358/1.15, 1.1
See application file for complete search history.

(56) References Cited

U.S. PATENT DOCUMENTS

| | | | |
|---|---|---|---|
| 7,252,633 B2 | 8/2007 | Obata et al. | |
| 8,189,225 B1 | 5/2012 | Lo et al. | |
| 9,134,932 B2 | 9/2015 | Shiraga | |
| 2001/0034774 A1 | 10/2001 | Watanabe et al. | |
| 2002/0105669 A1 | 8/2002 | Watanabe et al. | |
| 2005/0270556 A1 | 12/2005 | Shimamura | |

(Continued)

FOREIGN PATENT DOCUMENTS

| | | |
|---|---|---|
| CN | 1343063 A | 4/2002 |
| CN | 101834656 A | 9/2010 |

(Continued)

OTHER PUBLICATIONS

Oct. 8, 2014—(US) Non-Final Office Action—U.S. Appl. No. 14/206,571.

(Continued)

*Primary Examiner* — Martin Mushambo
(74) *Attorney, Agent, or Firm* — Banner & Witcoff, Ltd.

(57) ABSTRACT

A printing device includes a printing device side wireless communication unit configured to execute wireless communication with a mobile terminal, an operation acquisition unit configured to acquire user operation thereof, and a processor. The processor is configured to acquire instruction information via the printing device side communication unit, acquire at least one piece of image information from among a plurality of pieces of image information included in an image information set, acquire information, which is generated in response to an operation of the operation unit, as selection information which is used to identify image information selected by the user operation of the operation unit, and, in response to acquisition of the instruction information, execute a first print process to print an image based on the image information which is identified by the selection information.

10 Claims, 13 Drawing Sheets

(56) References Cited

U.S. PATENT DOCUMENTS

| | | | |
|---|---|---|---|
| 2007/0013963 A1* | 1/2007 | Nakamura | H04N 1/00127 358/403 |
| 2007/0229857 A1 | 10/2007 | Aiso | |
| 2009/0036056 A1* | 2/2009 | Oshima et al. | 455/41.3 |
| 2009/0103124 A1 | 4/2009 | Kimura et al. | |
| 2009/0207428 A1 | 8/2009 | Tanimoto et al. | |
| 2010/0020355 A1 | 1/2010 | Imai | |
| 2010/0069008 A1 | 3/2010 | Oshima et al. | |
| 2010/0097625 A1 | 4/2010 | Kurihara | |
| 2010/0188695 A1 | 7/2010 | Okigami | |
| 2010/0225962 A1 | 9/2010 | Okigami et al. | |
| 2010/0231958 A1 | 9/2010 | Okigami | |
| 2011/0026068 A1* | 2/2011 | Yoshida | 358/1.14 |
| 2011/0043857 A1 | 2/2011 | Hiroki | |
| 2012/0205432 A1 | 8/2012 | Stone et al. | |
| 2012/0246566 A1 | 9/2012 | Shiraga | |
| 2012/0264372 A1 | 10/2012 | Chen et al. | |
| 2013/0044341 A1 | 2/2013 | Uchino | |
| 2013/0141747 A1 | 6/2013 | Oba et al. | |
| 2013/0229690 A1 | 9/2013 | Sumita et al. | |
| 2013/0235422 A1 | 9/2013 | Nakata | |
| 2013/0267277 A1 | 10/2013 | Okigami | |
| 2014/0185097 A1 | 7/2014 | Shiraga | |
| 2014/0253964 A1 | 9/2014 | Asai | |
| 2014/0268231 A1 | 9/2014 | Ito | |

FOREIGN PATENT DOCUMENTS

| | | |
|---|---|---|
| CN | 102736870 A | 10/2012 |
| CN | 103309633 A | 9/2013 |
| EP | 1199627 A2 | 4/2002 |
| EP | 2026195 A2 | 2/2009 |
| JP | 2004-328275 A | 11/2004 |
| JP | 2007-166538 A | 6/2007 |
| JP | 2007-261042 A | 10/2007 |
| JP | 2009-037566 A | 2/2009 |
| JP | 2009-251823 A | 10/2009 |
| JP | 2010-041580 A | 2/2010 |
| JP | 2010177947 A | 8/2010 |
| JP | 2012-039518 A | 2/2012 |
| JP | 2012-160207 A | 8/2012 |
| JP | 2012-203745 A | 10/2012 |
| JP | 2013-041519 A | 2/2013 |
| WO | 2010107125 A1 | 9/2010 |

OTHER PUBLICATIONS

Aug. 8, 2014—(US) Non-Final Office Action—U.S. Appl. No. 14/182,661.
Sep. 15, 2014—(US) Non-Final Office Action—U.S. Appl. No. 14/142,046.
Extended EP Search Report mailed Apr. 1, 2014, EP Appln. 13199178.8.
NFC Forum: "NFC Data Exchange Format (NDEF)—NDEF 1.0", Internet Citation, Jul. 24, 2006, XP002413994, Retrieved from the Internet: URL:http://www.nfc-forum.org/specs/spec_license/ download_spec/0f5678c114d295e2da0d902f4e7839846281fc44/ NFCForum-TS-NDEF_1.0.pdf [retrieved on Jan. 10, 2007].
Sep. 10, 2015—(US)—Non-Final Office Action—U.S. Appl. 14/697,377.
Jul. 17, 2015—(US) Non-Final Office Action—U.S. Appl. No. 14/142,046.
Jun. 12, 2015—(CN) Notification of First Office Action—App 201310741160.7, Eng Tran.
Dec. 8, 2014—(US) Notice of Allowance—U.S. Appl. No. 14/182,661.
Jan. 7, 2015—(US) Notice of Allowance—U.S. Appl. No. 14/206,571.
Jan. 9, 2015—(EP) Extended EP Search Report—App 14152700.2.
Mar. 27, 2015—(US) Final Office Action—U.S. Appl. No. 14/142,046.
Jan. 29, 2016—(US) Notice of Allowance—U.S. Appl. No. 14/142,046.
Jan. 12, 2016—(JP) Notification of Reasons for Rejection—App 2013-051929, Eng Tran.
Feb. 9, 2016—(US) Final Office Action—U.S. Appl. No. 14/697,377.
Sep. 29, 2015—(JP) Notification of Reasons for Rejection—App 2013-073552, Eng Tran.
Feb. 26, 2016—(CN) Notification of the Second Office Action— App 201310741160.7, Eng Tran.
Feb. 23, 2016—(CN) Notification of Reasons for Rejection—App 2012-285178, Eng Tran.
Jun. 8, 2016—(CN) Notification of First Office Action—App 201410083473.2, Eng Tran.
May 26, 2016—(CN) Notification of First Office Action—App 201410123834-1, Eng Tran.

* cited by examiner

PRINTING DEVICE, MOBILE TERMINAL, AND COMPUTER READABLE RECORDING MEDIUM FOR THE SAME

CROSS-REFERENCE TO RELATED APPLICATION

This application claims priority under 35 U.S.C. §119 from Japanese Patent Application No. 2013-073552 filed on Mar. 29, 2013. The entire subject matter of the application is incorporated herein by reference.

BACKGROUND

1. Prior Art

The following description relates to a printing device configured to execute a print operation based on print data transmitted from a terminal device to the printing device, the mobile terminal configured to transmit print data to the printing device, and computer readable medium containing instructions to cause above operations.

2. Technical Field

Specifically, when data communication is performed between a first communication device and a second communication device, initially, the first communication device acquires a communication system and an encryption system from the second communication device via the NFC. Then, when the acquired communication system and the acquired encryption system are coincident with a predetermined communication system and a predetermined encryption system for the first communication device, respectively, the first communication device is allowed to perform data communication with the second communication device via another communication system capable of higher-speed data communication than the NFC. Such a system may be employed in a communication system including a mobile terminal and a printing device.

SUMMARY

When the mobile terminal such as a smartphone or a tablet PC are located close to the printing device and the NFC is established therebetween, further operations by a user are required to execute a printing operation. Conventionally, operability of the user in such a system employing the NFC has not been considered.

Aspects of the invention provide a technique improving the operability of the user in such a system.

According to aspects of the present invention, there is provided a printing device, which includes a printing device side wireless communication unit configured to execute wireless communication with a mobile terminal, an operation acquisition unit configured to acquire user operation thereof, and a processor. The processor is configured to acquire instruction information via the printing device side communication unit, acquire at least one piece of image information from among a plurality of pieces of image information included in an image information set, acquire information, which is generated in response to an operation of the operation unit, as selection information which is used to identify image information selected by the user operation of the operation unit, and, in response to acquisition of the instruction information, execute a first print process to print an image based on the image information which is identified by the selection information.

According to aspects of the present invention, there is also provided a non-transitory computer readable recording medium storing instructions to be executed by a processor of a printing device, the printing device comprising a printing device side wireless communication unit configured to execute wireless communication with a mobile terminal and an operation acquisition unit configured to acquire user operation thereof. The instructions cause the processor to acquire instruction information via the printing device side communication unit, acquire at least one piece of image information from among a plurality of pieces of image information included in an image information set, acquire information, which is generated in response to an operation of the operation unit, as selection information which is used to identify image information selected by the user operation of the operation unit, and, in response to acquisition of the instruction information, execute a first print process to print an image based on the image information which is identified by the selection information.

According to aspects of the present invention, there is also provided a non-transitory computer readable recording medium storing instructions to be executed by a processor of a mobile terminal having a wireless communication unit through which the mobile terminal is communicatable with a printing device. The instructions, when executed, cause the processor to transmit at least one piece of image information included in image information set which is capable of containing a plurality of pieces of image information, and transmit instruction information instructing to handle information which is generated in response to a user operation of an operation acquiring unit provided to the printing device as selection information used to identify image information selected by the user from among the plurality of pieces of image information included in the image information set.

According to aspects of the invention, there is also provided a mobile terminal, which includes a wireless communication unit through which the mobile terminal is communicatable with a printing device, and a processor. The processor is configured to transmit at least one piece of image information included in image information set which is capable of containing a plurality of pieces of image information, and transmit instruction information instructing to handle information which is generated in response to a user operation of an operation acquiring unit provided to the printing device as selection information used to identify image information selected by the user from among the plurality of pieces of image information included in the image information set.

BRIEF DESCRIPTION OF THE ACCOMPANYING DRAWINGS

DESCRIPTION OF THE EMBODIMENTS

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

First Embodiment

Figure 1:
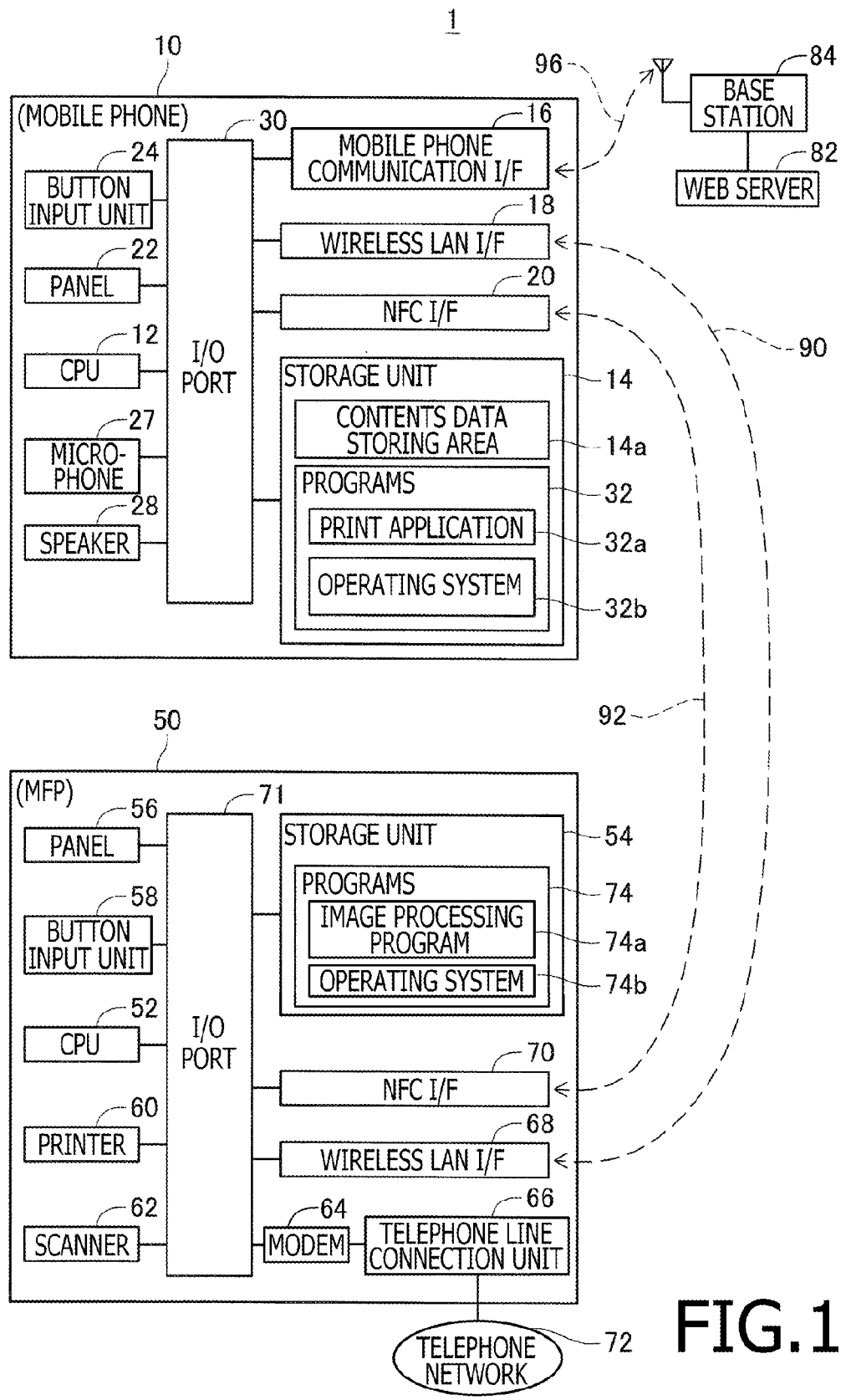
FIG. 1 is a block diagram showing electrical configuration of a communication system according to a first embodiment of the invention.

As shown in FIG. 1, a communication system 1 of the embodiment includes a mobile phone 10, a multi-function peripheral (MFP) 50, a web server 82, and a base station 84. Each of the mobile phone 10 and the MFP 50 is configured to serve as a wireless LAN terminal device. Further, the MFP 50 is configured to have a plurality of functions such as a printing function, a scanning function, a copying function, and a facsimile function. The web server 82 is configured to provide a client device, via a network, with a function and data owned by the web server 82.

It is noted that meaning of terms "data" and "information" used in this specification will be defined as follows. Throughout the specification, the term "data" is used to have broader concept than the "information." Therefore, "data A" might occasionally be referred to as "information A." Further, "data B", which is copied or converted from the "data A", may also be referred to as "information A" as far as it is used to mean the "data A."

A configuration of the mobile phone 10 will be described. The mobile phone 10 includes a central processing unit (CPU) 12, a storage unit 14, a mobile phone communication interface (I/F) 16, a wireless LAN interface (I/F) 18, an NFC interface (I/F) 20, a panel 22, a button input unit 24, a microphone 27, and a speaker 28. These elements 12, 14, 16, 18, 20, 22, 24, 27, and 28 are configured to communicate with each other via an input-output port 30.

The wireless LAN I/F 18 is configured to perform WiFi Direct (WFD)(registered trademark) wireless communication 92 based on the communication standard IEEE 802.11 or an equivalent standard. Namely, the mobile phone 10 is configured to perform direct data communication with the MFP 50 when accessing an access point of the MFP 50 so as to be allowed to perform the WFD wireless communication 92.

The NFC I/F 20 is configured to perform NFC wireless communication 92 based on international standards of ISO/IEC21481 or ISO/IEC18092. Namely, the mobile phone 10 is configured to perform direct data communication with the MFP 50 when put into a state of the NFC wireless communication 92 being available. In this respect, nonetheless, the NFC wireless communication 92 has a shorter communicable distance and a lower communication speed than the WFD wireless communication 90.

The mobile phone communication I/F 16 is configured to perform mobile phone wireless communication 96 with the base station 84. Namely, the mobile phone 10 is configured to perform data communication via the web server 82 and the base station 84 when put into a state of the mobile phone wireless communication 96 being available.

The CPU 12 is configured to carry out processes in accordance with programs 32 stored in the storage unit 14. Hereinafter, the CPU 12 executing the programs (such as a print application 32a) may be simply referred to as a program name. For instance, "the print application 32a" may represent "the CPU 12 that executes the print application 32a." It is noted that the storage unit 14 may include a combination of a random access memory (RAM), a read only memory (ROM), a flash memory, a hard disk drive (HDD), and a buffer of the CPU 12.

The storage unit 14 is configured to store the programs 32, which contain the print application 32a and an operating system (OS) 32b. The print application 32a is configured to cause the CPU 12 to carry out a process for controlling the MFP 50 to print images expressed by contents data stored in a contents data storage area 14a.

The storage unit 14 may be a computer-accessible storage medium. The term "computer-accessible storage medium" is intended to cover a non-transitory storage medium such as a ROM, a RAM, a flash memory, and a hard disk. It is noted that the non-transitory storage medium does not include electrical signals which carry programs when they are downloaded from a server on a network.

The OS 32b is a program configured to provide a basic function to be used by the print application 32a. The OS 32b contains programs for performing the wireless communications 90, 92, and 96 via the wireless LAN I/F 18, the NFC I/F 20, and the mobile phone communication I/F 16, and programs for controlling the storage unit 14, the panel 22, and the button input unit 24.

Further, the storage unit 14 includes the contents data storage area 14a, which is configured to store a plurality of pieces of photograph data (e.g., JPEG data) and document data (e.g., PDF data). In addition, the document data generally contains a plurality of pieces of page document data corresponding to a plurality of pages. The photograph data is an example of the image data. The page document data is also an example of the image data. The print application 32a is configured to acquire data from the storage unit 14 via the OS 32b.

The panel 22 includes a display screen configured to display various functions of the mobile phone 10. The print application 32a is configured to output and display image data on the panel 22 via the OS 32b. The button input unit 24 includes a touch sensor, and is integrated with the panel 22. Thus, the button input unit 24 is configured to detect an input medium close to or in contact with the panel 22, and accept a user's button operation. The print application 32a is configured to acquire, via the OS 32b, data indicating what button operation has been performed by the user.

A configuration of the MFP 50 will be described. The MFP 50 includes a CPU 52, a storage unit 54, a panel 56, a button input unit 58, a printer 60, a scanner 62, a MODEM (modulator-demodulator) 64, a telephone network connection unit 66, a wireless LAN I/F 68, and an NFC I/F 70. These elements are configured to communicate with each other via an input-output port 71.

The wireless LAN I/F 68 is configured to perform WiFi Direct (WFD)(registered trademark) wireless communication 92 based on the communication standard IEEE 802.11 or an equivalent standard. The NFC I/F 70 is configured to perform NFC wireless communication 92 based on international standards of ISO/IEC21481 or ISO/IEC18092.

The CPU 52 is configured to carry out processes in accordance with programs 74 stored in the storage unit 54. Hereinafter, the CPU 52 executing the programs (such as a print process program 72a) may be simply referred to as a program name for brevity. For instance, "the print process program 72a" may represent "the CPU 52 that executes the print process program 72a."

The storage unit 54 is configured to store programs 74, which include the print process program 74a and an operating system 74b (occasionally referred to simply as OS). The print process program 74a is a program that causes the CPU 52 to execute a process in which the printer 60 prints out an image represented by the contents data stored in the contents data storing unit 14a of the mobile phone 10.

The OS 74b is a program providing basic functions utilized by the print process program 74a. The OS 74b includes programs for executing the wireless communications 90 and 92 via the wireless LAN I/F 68 and the NFC I/F 70, and programs for controlling the storage unit 54, the panel 56 and the button input unit 58. The storage unit 54 may be a computer-accessible storage medium similar to the storage unit 14.

The panel 56 has a displaying surface which displays the functions of the MFP 50. The print process program 74a outputs image data for display, displays the image based on the image data for display via the OS 74b. The button input unit 58 includes a touch sensor which is integrally provided to the panel 56. The touch sensor detects approach/touch of an input device (e.g., a user's finger) with respect to the panel 56 and acquires a user operation of the buttons of the button input unit 58. The print process program 74a acquires data indicative of user operation of the button input unit 58 via the OS 74b.

The printer 60 executes a printing operation, and the scanner 62 executes a scanning operation. The MODEM 64 functions to modulate data of original to be sent by facsimile to a signal that can be transmitted through the telephone network 72 and transmit the same via the telephone circuit connecting unit 66 and/or receives a signal, via the telephone circuit connecting unit 66, from the telephone network 72 and demodulate the received signal to reproduce data of original.

<Image Browsing on Mobile Phone>

Figure 3:
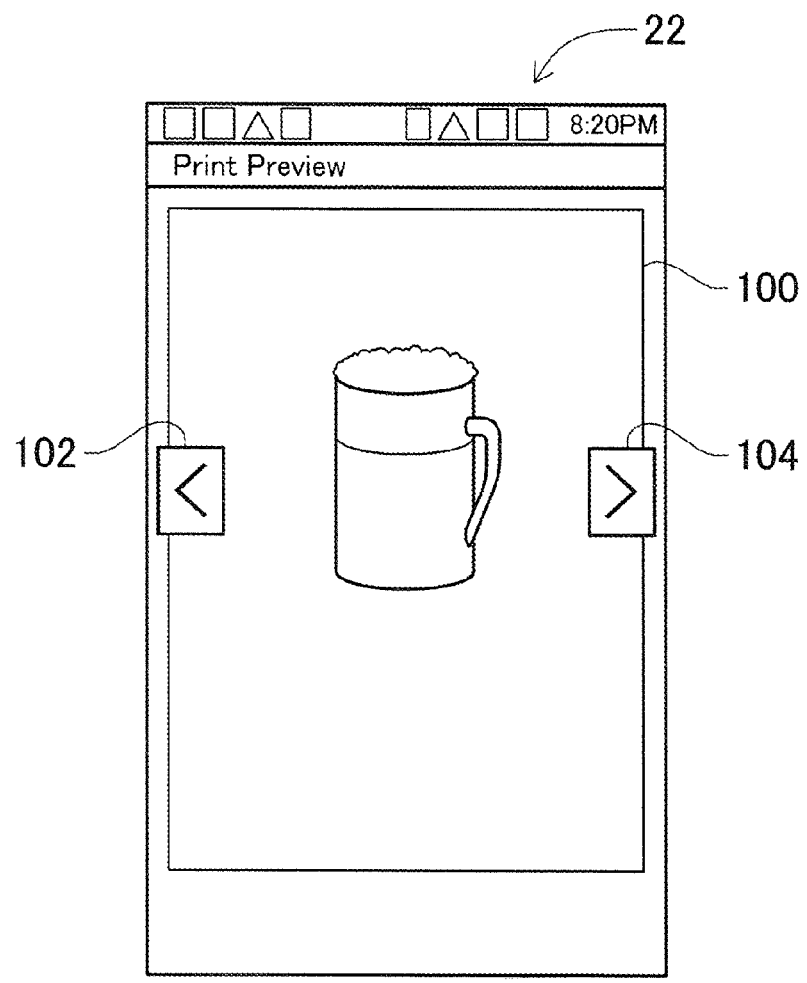
FIG. 3 shows an example showing a state where an image is displayed on a panel of a mobile phone according to the first embodiment of the invention.

On the mobile phone 10, the user can browse images based on contents data stored in the contents data storage area 14a. Specifically, in the contents data storage area 14a of the mobile phone 10, a plurality of pieces of JPEG photograph data and a plurality of pieces of PDF data (document data) are stored. The contents data (e.g., the photograph data, the document data, and the like) includes one or more pieces of image data. As shown in FIG. 3, images 100 are displayed, one by one, based on one of more pieces of image data included in a predetermined range of contents data.

When an image based on the photograph data is displayed, images based on one or more pieces of photograph data within a predetermined group are displayed. The photograph data within the predetermined group may be, for example, the photograph data in one folder or the photograph data attached with a predetermined tag. When the images are displayed based on the document data, images based on one or more pages of the page document data included in the document data. Optionally, one or more pieces of image data, which have been selected by the user from among a plurality of pieces of image data, may be displayed. On both sides of the image 100, a back button 102, and a forward button 104 are displayed. The back and forward buttons 102 and 104 are for sequentially switching the displayed image 100. By tapping the back button 102 or the forward button 104, the used can display a desired image 100 on the panel 22. With the above operation, the user can browse desired images based on one or more pieces of image data included in the contents data. That is, the image displayed on the panel 22 is an example of an image displayed base on the image data selected on the mobile phone 10 by the user.

<Handover Process>

Figure 2:
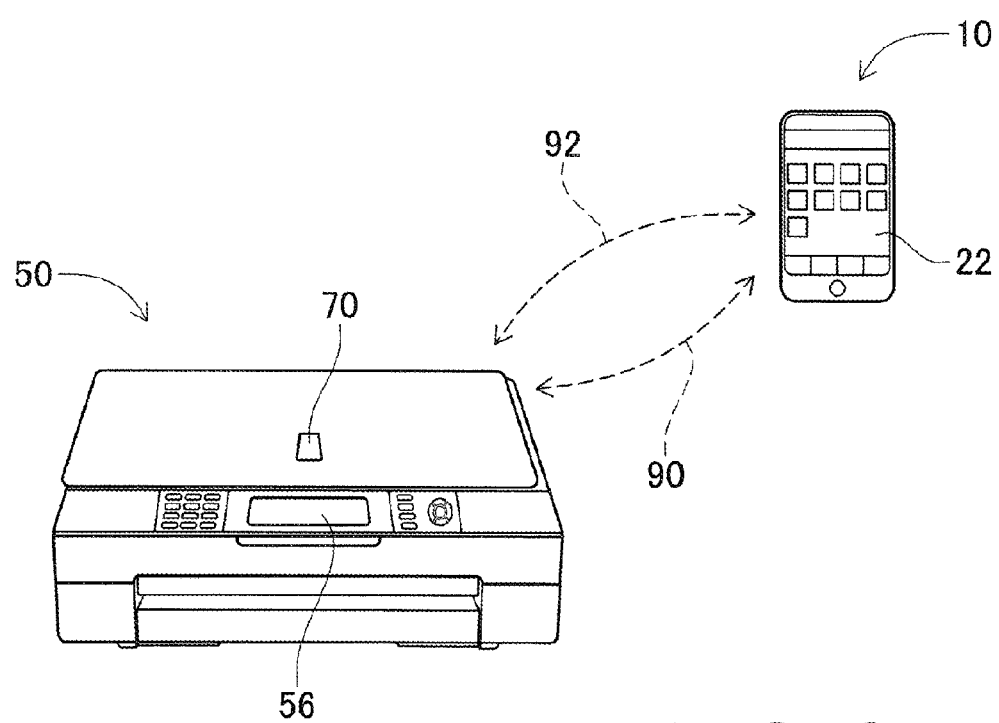
FIG. 2 is a perspective view showing the communication system according to the first embodiment of the invention.

According to the communication system 1, any image 100 the user browses with the mobile phone 10 can be printed with use of the MFP 50. Specifically, by bringing the mobile phone 10 close to the MFP 50 to establish the NFC wireless communication 92, printing making use of the NFC wireless communication 92 (which is also referred to as NFC printing) can be executed. Incidentally, since the NFC wireless communication 92 is performed between the NFC I/F 20 of the mobile phone 10 and the NFC I/F 70 of the MFP 50, the mobile phone 10 is brought close to the NFC I/F 70 of the MFP 50. According to the exemplary embodiment, the NFC I/F 70 is arranged on the upper surface of the MFP 50 as shown in FIG. 2.

When the mobile phone 10 is located close to the MFP 50 and a distance between the mobile phone 10 and the MFP 50 is small enough (i.e., within a communicatable range of the NFC wireless communication 92), an initial sequence of the NFC wireless communication 92 is performed between the mobile phone 10 and the MFP 50, and the NFC wireless communication 92 is established therebetween. When the NFC wireless communication 92 has been established, connection information necessary to establish the WFD communication 90 is exchanged between the mobile phone 10 and the MFP 50 with use of the NFC wireless communication 92.

The reason why the WFD wireless communication 90 is established is as follows. Generally, it is preferable to transmit/receive the document data and/or photograph data in accordance with the WFD wireless communication 90 since the WFD wireless communication 90 can execute a high-speed data transmission/reception in comparison with the NFC wireless communication 92. It is also noted that the WFD wireless communication 90 can handle transmission/reception of data for a relatively long distance in comparison with the NFC wireless communication. Therefore, also in this regard, it is preferable to use the WFD wireless communication 90 for transmitting/receiving the document data and photograph data.

A process of switching from the NFC wireless communication 92 to the WFD wireless communication 90 making use of the NFC wireless communication 92 is known as a handover process, which will be described referring to FIG. 4.

As connection information necessary to establish the WFD wireless communication, an SSID (service set identified) is known as an example. The SSID is transmitted/received between the mobile phone 10 and the MFP 50 with use of the NFC wireless communication 92. Specifically, when the NFC wireless communication 92 is established, firstly, the SSID which the wireless LAN I/F 19 of the mobile phone 10 uses is transmitted to the MFP 50 via the NFC wireless communication 92 (M100).

Then, the SSID for connecting to the wireless LAN I/F 68 of the MFP 50 and establishing the WFD wireless communication 90 is transmitted, via the NFC wireless communication 90, from the MFP 50 to the mobile phone 10 (M102). Then, the mobile phone 10 establishes the WFD wireless communication 90 with respect to the MFP 50 based on the SSID of the MFP 50 (M104).

<Selection of Print Image on Printing Device>

When the WFD wireless communication 90 is established between the mobile phone 10 and the MFP 50, display instruction data is transmitted from the mobile phone 10 to the MFP 50 with use of the WFD wireless communication 90 (M106). The display instruction data is instruction data which causes the panel 56 of the MFP 50 to display two kinds of print buttons 110 and 112. When the MFP 50 receives the display instruction data, the MFP 50 displays the two kinds of print buttons 110 and 112 on the panel 56 as shown in FIG. 5 (FIG. 4: M108). One print button 110 is for printing the image 100 displayed on the panel 22 of the mobile phone 10 (which will be occasionally referred to as a display image print button), while the other button 112 is for printing the images based on all the pieces of image data included in the contents data within a predetermined range (which button will be occasionally be referred to as all image print button).

As the user operates the display image print button 110 or all image print button 112, the image(s) desired by the user will be printed by the printer 60 of the MFP 50. Specifically, when the user operates the display image print button 110 or all image print button 112, the MFP 50 stores information necessary related to the image(s) to execute the print operation according to the operated button (110 or 112) (M110). More specifically, when the display image print button 110 is operated, information indicating that image data of an image 100 currently displayed on the panel 22 of the mobile phone 10 is stored in the storage unit 54 of the MFP 50. When the all image print button 112 is operated, all the image data of the contents data which includes image data of the image 100 currently displayed on the panel 22 of the mobile phone 10 is stored in the storage unit 54 of the MFP 50.

Further, response instruction data instructing to transmit the selection information stored in the storage unit 54 to the mobile phone 10 is transmitted from the mobile phone 10 to the MFP 50 via the WFD wireless communication 90 (M112). The MFP 50, when receives the response instruction data, transmits the selection information which is stored as the print button 110 or 112 is operated, to the mobile phone 10 via the WFD wireless communication 90.

When the mobile phone 10 receives the selection information, it transmits the image data corresponding to the received selection information to the MFP 50 via the WFD wireless communication 90 (M116). Specifically, if the received selection information is information stored when the display image print button 110 was operated, the mobile phone 10 transmits the image data of the image 100 displayed on the panel 22 of the mobile phone 10 to the MFP 50. If the received selection information is information stored when the all image print button 112 was operated, the mobile phone 10 transmits the all the image data of the contents data including the image 100 displayed on the panel 22 of the mobile phone 10 to the MFP 50. The MFP 50, when receives the image data from the mobile phone 10, executes the print operation based on the received image data (M118).

As described above, according to the communication system 1, when the NFC printing is executed, the print buttons 110 and 112 used for selecting the image(s) subject to printing are displayed on the panel 56 of the MFP 50. Accordingly, when the user intends to execute the NFC printing, he/she firstly make the mobile phone 10 located close to the MFP 50, and then selects the image(s) subject to print with the MFP 50. That is, the user can execute the NFC printing without operating the mobile phone 10. This improves the operability of the system 1 when the NFC printing is executed.

<NFC Printing Using Mobile Phone Unable to Transmit Display Instruction Data>

According to the above-described communication system 1, as the print buttons 110 and 112 are displayed on the panel 54 of the MFP 50, the user can select images to be printed on the MFP 50. In other words, if such display instruction data is not transmitted from the mobile phone 10 to the MFP 50, the print button 110 or 112 will not displayed on the panel 56 of the MFP 50, and therefore the used cannot select the images on the MFP 50. Transmission of the display instruction data from the mobile phone 10 is done as the print application 32a is executed. Therefore, another mobile phone which has the same structure as the mobile phone 10 but does not have the print application 32a installed, selection of the images on the MFP 50 cannot be done.

If another print application which is different from the print application 32a is installed in the mobile phone 10, and such a print application is executed, selection button and print buttons may be displayed on the panel 22 of the mobile phone 10, and the user can select images subject to print by operating the selection buttons displayed on the panel 22 of the mobile phone 10. Thereafter, when the user operates the print button displayed on the panel 22 of the mobile phone 10, image data corresponding to the selected image is transmitted to the MFP 50 via the WFD wireless communication 90.

If the MFP 50 receives the image data without receiving the display instruction data, the MFP 50 executes, as a secondary process, a print process of printing based on the received image data. With such a configuration, even if a mobile phone unable to transmit the display instruction data is used, the NFC printing with the MFP 50 can be executed.

<Print Application and Print Process Program>

The above-described print process is executed as the print application 32a is executed by the CPU 12 of the mobile phone 10 and the print process program 74a is executed by the PCU 52 of the MFP 50.

Hereinafter, with reference to FIGS. 6, 7 and 8, a process of printing the image based on the contents data stored in the mobile phone 10 with the MFP 50 will be described.

Figure 6:
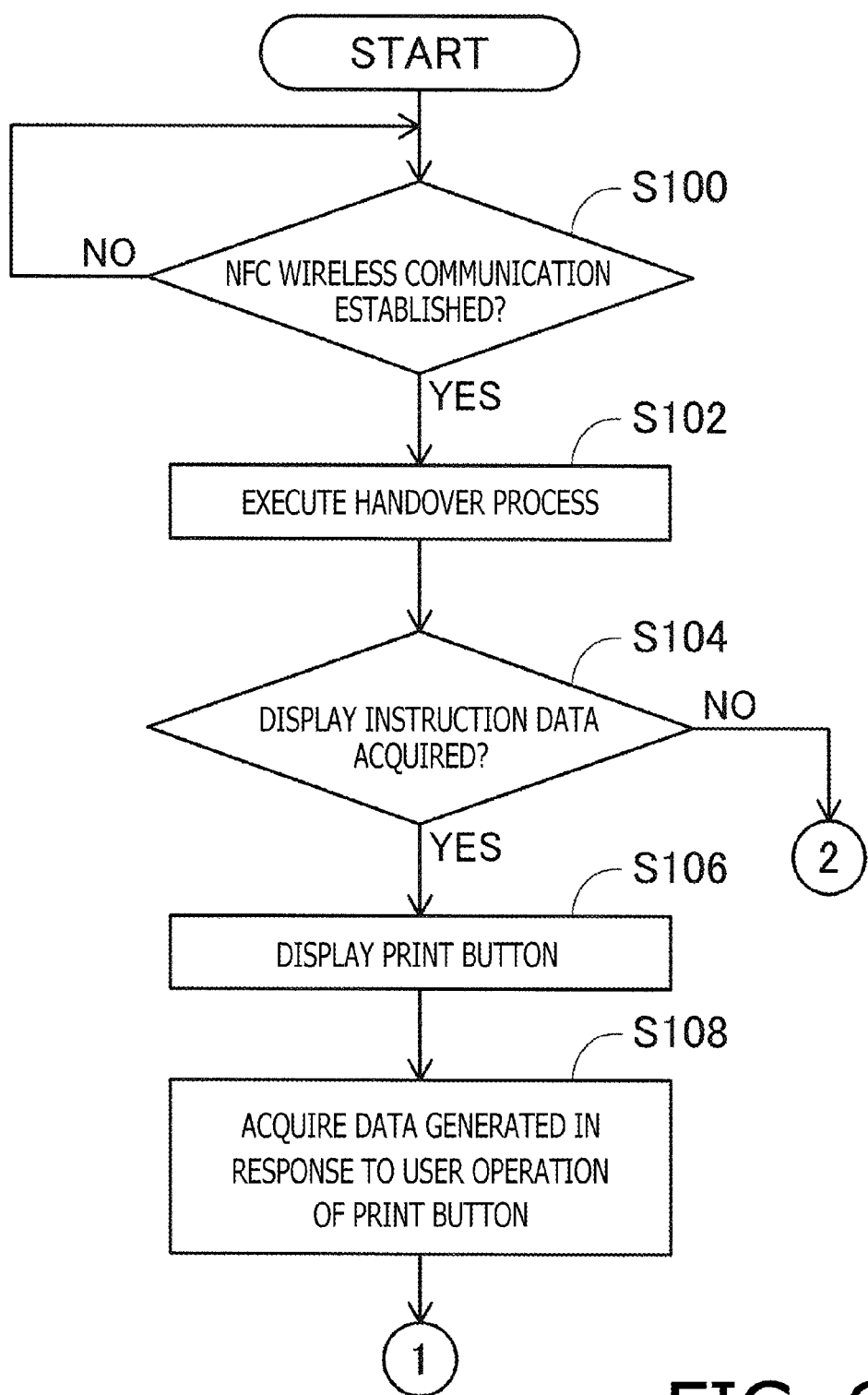
FIGS. 6 and 7 show a flowchart illustrating an operation of the MFP according to the first embodiment of the invention.
Figure 7:
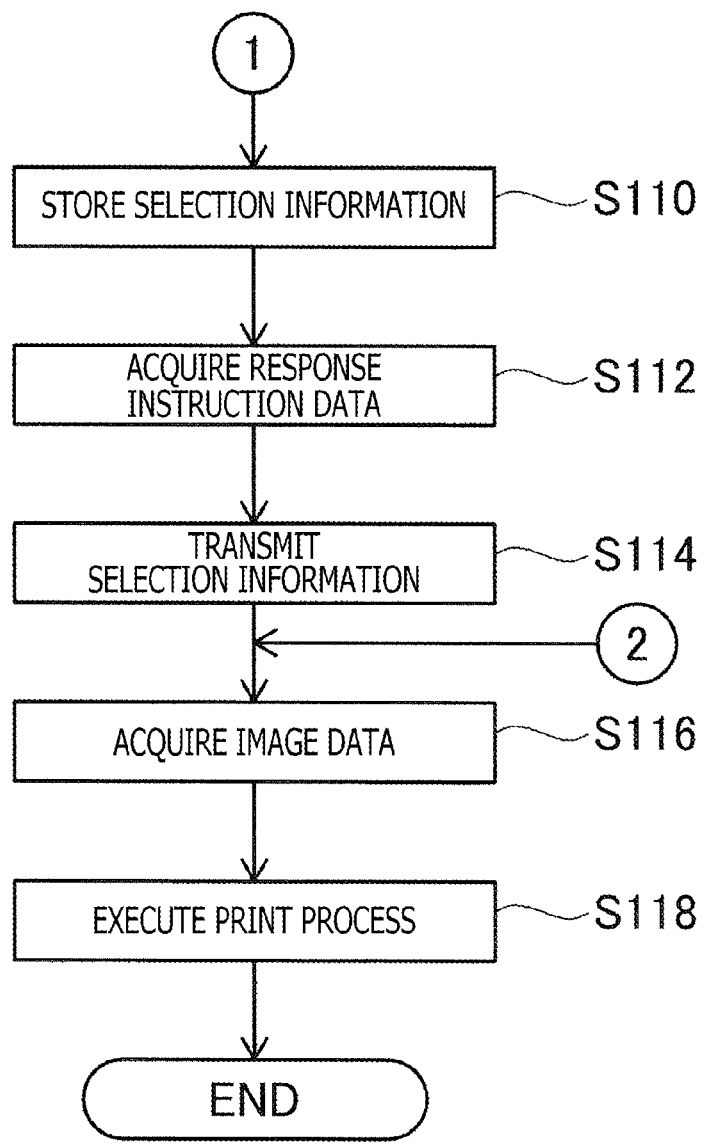

Firstly, referring to FIGS. 6 and 7, the print process program 74a, which is executed by the CPU 52 of the MFP 50, will be descried. When the MFP 50 is powered ON and the print process program 74a is invoked, a main flow as shown in the flowchart is started.

In S100, the CPU 52 judges whether the NFC wireless communication 92 is established. Specifically, the CPU 52 determines that the NFC wireless communication 92 is established when the CPU 52 receives event data, which is output by the OS 32b when the NFC wireless communication 92 has been established. If the NFC wireless communication 92 is not established (S100: NO), step S100 is repeatedly executed. If the NFC wireless communication 92 is established (S100: YES), the CPU 52 proceeds to S102, where the CPU 52 executes a handover process. Thereafter, the CPU 52 proceeds to S104.

In S104, the CPU 52 judges whether the CPU 52 has received data, which is generated when the display instruction data via the WFD wireless communication, via the OS 74d. That is, as mentioned above, the CPU 52 judges whether wireless LAN I/F 68 has received the instruction data which instructs to display the print buttons 110 and 112 on the panel 56 of the MFP 50. If the display instruction data has not been received (S104: NO), the CPU 52 proceeds to S116.

If the display instruction data has been received (S104: YES), the CPU 52 proceeds to S106. In S106, the CPU 52 outputs the image data for displaying the print buttons 110 and 112 on the panel 56, via the OS 74b. With this configuration, as mentioned above, it becomes possible that the user selects images to be printed n the MFP 50. Next, the CPU 52 proceeds to S108.

In S108, the CPU 52 obtains the data which is generated in response to the user operation of the print button 110 or 112 via the OS 74b, and proceeds to S110. In S110, the CPU 52 outputs data used to store the selection information in the storage unit 54 via the OS 74b. As mentioned above, the selection information related to the image data necessary to execute the print process in accordance with the operated print button 110 or 112 is stored in the storage unit 54. Then, the CPU 52 proceeds to S112.

In S112, the CPU 52 obtains, via the OS 74b, the data that was generated as the response instruction data is received via the WFD wireless communication 90, and proceeds to S114. In S114, the CPU 52 outputs, via the OS 74b, the selection information stored in the storage unit 54 so that the wireless LAN I/F 68 transmits the same to the wireless LAN I/F 18 of the mobile phone 10 via the WFD wireless communication 90. Then, the CPU 52 proceeds to S116.

In S116, the CPU 52 obtains, via the OS 74b, the data which was generated as the image data is obtained via the WFD wireless communication 90, and proceeds to S118. In S118, the CPU executes the print process of the image based on the obtained image data. That is, the CPU 52 outputs, via the OS 74b, the data to cause the printer 60 to execute the print process based on the obtained image data.

If the display instruction data has not been obtained (S104: NO), steps S116 onward will be executed. As mentioned above, in the MFP 50, if the image data has been received without receiving the display instruction data, the print process of the image based on the received image data is executed.

Next, with reference to FIG. 8, the print application 32a which is executed by the CPU 12 of the mobile phone 10 will be described. When the mobile phone 10 is turned ON, and the print application 32a is invoked, a main process shown in FIG. 8 is started. In S200 of the main process, the CPU 12 judges wither the NFC wireless communication 92 is established. Specifically, the CPU 12 determines that the NFC wireless communication 92 is established when even data, which is output by the OS 32b if the NFC wireless communication 92 is established, is received. If the NFC wireless communication 92 is not established (S200: NO), step S200 is repeated. When the NFC wireless communication 92 has been established (S200: YES), the CPU 12 proceeds to S202. In S202, the CPU 12 executes the handover process described above, and proceeds to S204.

In S204, the CPU 12 output, via the OS 32b, the display instruction data so that the wireless LAN I/F 18 transmits the same to the wireless LAN I/F 78 of the MFP 50. That is, as mentioned before, the CPU 12 transmits, via the WFD wireless communication 92, the instruction data which causes the panel 56 of the MFP 50 to display the print buttons 110 and 112, to the MFP 50. Then, the CPU 12 proceeds to S206.

In S206, the CPU 12 outputs, via the OS 32b, the response instruction data so that the wireless LAN I/F 18 transmits the same to the wireless LAN I/F 78 of the MFP 50 via the WFD wireless communication 90. That is, as described above, the CPU 12 transmits the instruction data instructing to transmit the selection information which is stored in response to the user operation of the print button 110 or 112 to the MFP 50. Then, the CPU 12 proceeds to S208.

In S208, the CPU 12 judges whether the data, which was generated as the selection information is obtained via the WFD wireless communication 90, is obtained via the OS 32b. Specifically, the CPU 12 judges whether the selection information, which has been stored in response to the user operation of the print button 110 or 112, is obtained from the MFP 50. If the selection information has not been obtained (S208: NO), the CPU 12 returns to S206.

When the selection information has been obtained (S208: YES), the CPU 12 proceeds to S210. In S210, the CPU 12 outputs, via the OS 32b, the data for storing the image data corresponding to the selection information. Then, the CPU 12 proceeds to S212. In S212, the CPU 12 transmits the image data corresponding to the selection information, and a print instruction to print an image based on the print data to the MFP 50 via the WFD wireless communication 90. That is, the CPU 12 outputs, via the OS 32, the image data corresponding to the selection information and the print instruction of the image based on the image data so that the wireless LAN I/F 18 transmits the same, via the WFD wireless communication 90, to the wireless LAN I/F 68. Then, the print application 32a is finished.

Second Embodiment

Hereinafter, a communicating system 1 according to a second embodiment of the invention will be described. It is noted that the electrical configuration of the communication system according to the second embodiment is the same as that according to the first embodiment, and the detail description thereof will be omitted for brevity.

Figure 9:
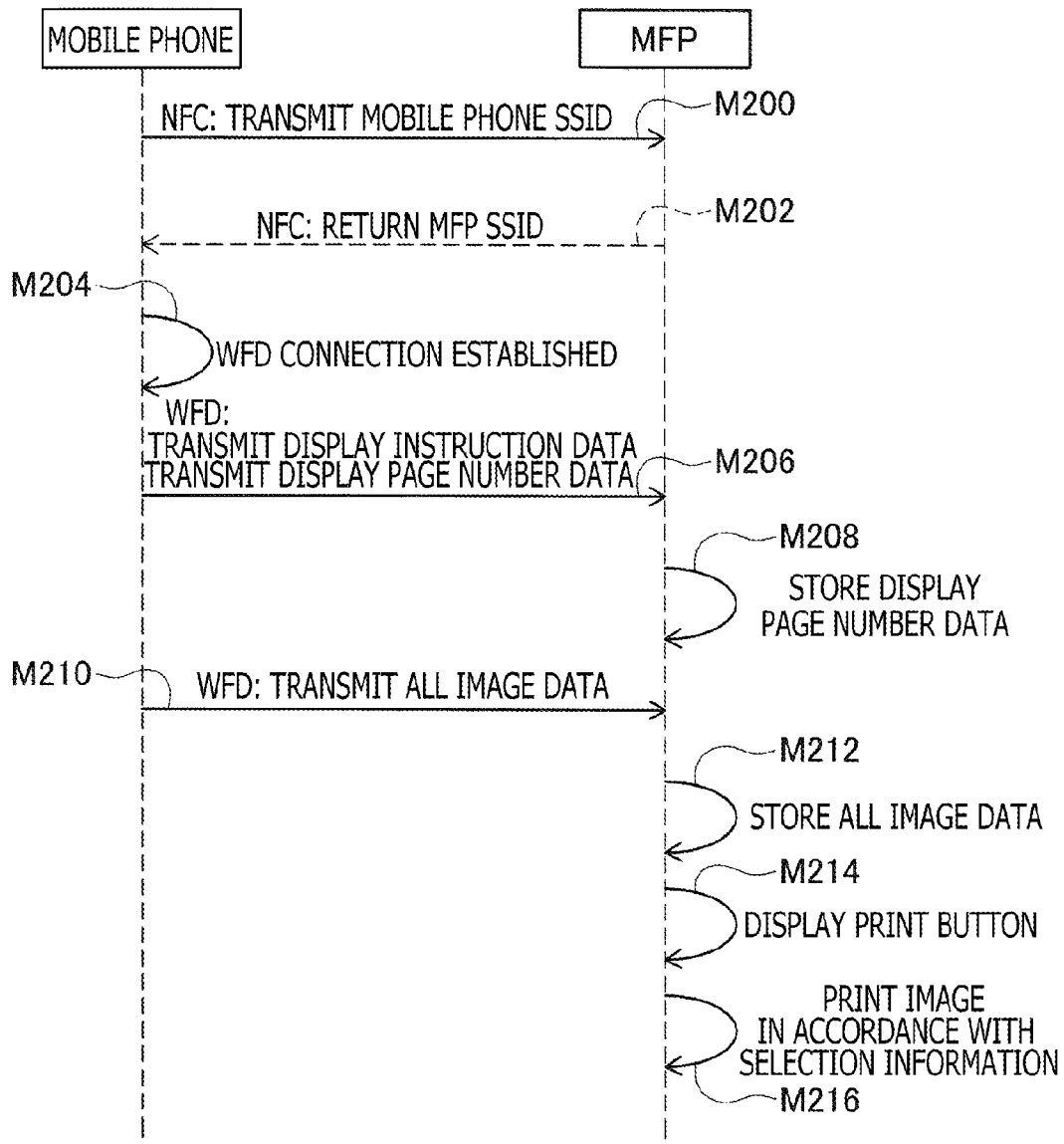
FIG. 9 is a sequence chart illustrating a printing process is executed in the communication system according to a second embodiment of the invention.

In the communication system 1 according to the first embodiment, the image data subject to print, from among the plurality of pieces of image data included in the contents data, is transmitted from the mobile phone 10 to the MFP 50. According to the second embodiment, all of the plurality of pieces of image data included in the contents data are transmitted from the mobile phone 10 to the MFP 50. Then, on the MFP 50 side, from among all of the plurality of pieces of the image data, images corresponding to selected pieces of the image data, which are selected on the MFP 50 side, will be processed. Hereinafter, the second embodiment will be described in detail with reference to FIG. 9.

As described above, the user causes the mobile phone 10 to display the image subject to print on the panel 22 of the mobile phone 10. Then, the user make the mobile phone 10 located close to the NFC I/F 70 of the MFP 50. As the mobile phone 10 is located close to the MFP 50, as mentioned above, the NFC wireless communication 92 is established. Then, making use of the NFC wireless communication 92, the WFD wireless communication 90 is established (M200, M202 and M204).

When the WFD wireless communication 90 is established between the mobile phone 10 and the MFP 50, with use of the WFD wireless communication 90, the display instruction data and the display page number data are transmitted from the mobile phone 10 to the MFP 50 (M206). The display instruction data in the second embodiment is the same instruction data as in the first embodiment, and is for causing the panel 56 of the MFP 50 to display the two types of print buttons 110 and 112. The display page number data is data indicating a page number of the image 100 which is being displayed on the panel 22 of the mobile phone 10. That is, the display page number data is data identifying the image data of the image 100 currently the user is browsing in the mobile phone 10 from among all of the plurality of pieces of image data included in the contents data. The MFP 50 stores the display page number data in the storage unit 54 in response to receipt of the same (M208).

After transmitting the display instruction data and the display page number data to the MFP 50, the mobile phone 10 transmits all the image data including the image data of the image 100 displayed on the panel 22, of a predetermined range of contents data to the MFP 50 via the WFD wireless communication 90 (M210). The MFP 50, in response to receipt of all the image data included in the contents data from the mobile phone 10, stores all the image data in the storage unit 54 (M212). Further, the MFP 50 displays, as shown in FIG. 5, the two types of print buttons 110 and 112 on the panel 56 in accordance with the display instruction data (M214).

Then, when the user operates one of the display image print button 110 and all image print button 112, the MFP 50 executes the print process corresponding to the operated button (M216). Specifically, when the display image print button 110 is operated by the user, the print process of an image based on the image data which is identified by the page number data is executed. That is, image data identified by the page number data is picked up from among all the image data stored in the storage unit 14, and the print process of the image based on the picked-up image data is executed. If the all image print button 112 is operated, the print process based on all the print image stored in the storage unit 14 is executed.

As described above according to the second embodiment, the print button 110 to select an image to be printed can be displayed on the panel 56 of the MFP 50 when the NFC print is executed, similarly to the first embodiment. With this configuration, with a user operation of the mobile phone 10, the NFC printing can be executed. Thus, the operability in executing the NFC printing is improved.

In the communication system 1 according to the second embodiment, when the MFP 50 does not receive the display instruction data, the print process of images based on all the image data stored in the storage unit 54 is executed as the second process. As aforementioned, the reason for such a control is employed is to enable the NFC printing when an application different from the application 32a is installed in the mobile phone 10. That is, when the print application different from the print application 32a is installed in the mobile phone 10a, the image to be printed can be selected on the mobile phone 10, and the image data corresponding to the selected image is transmitted to the MFP 50 via the WFD wireless communication 90. Therefore, even if the mobile phone which cannot transmit the display instruction data is used, the NFC printing using the MFP 50 can be executed.

Figure 10:
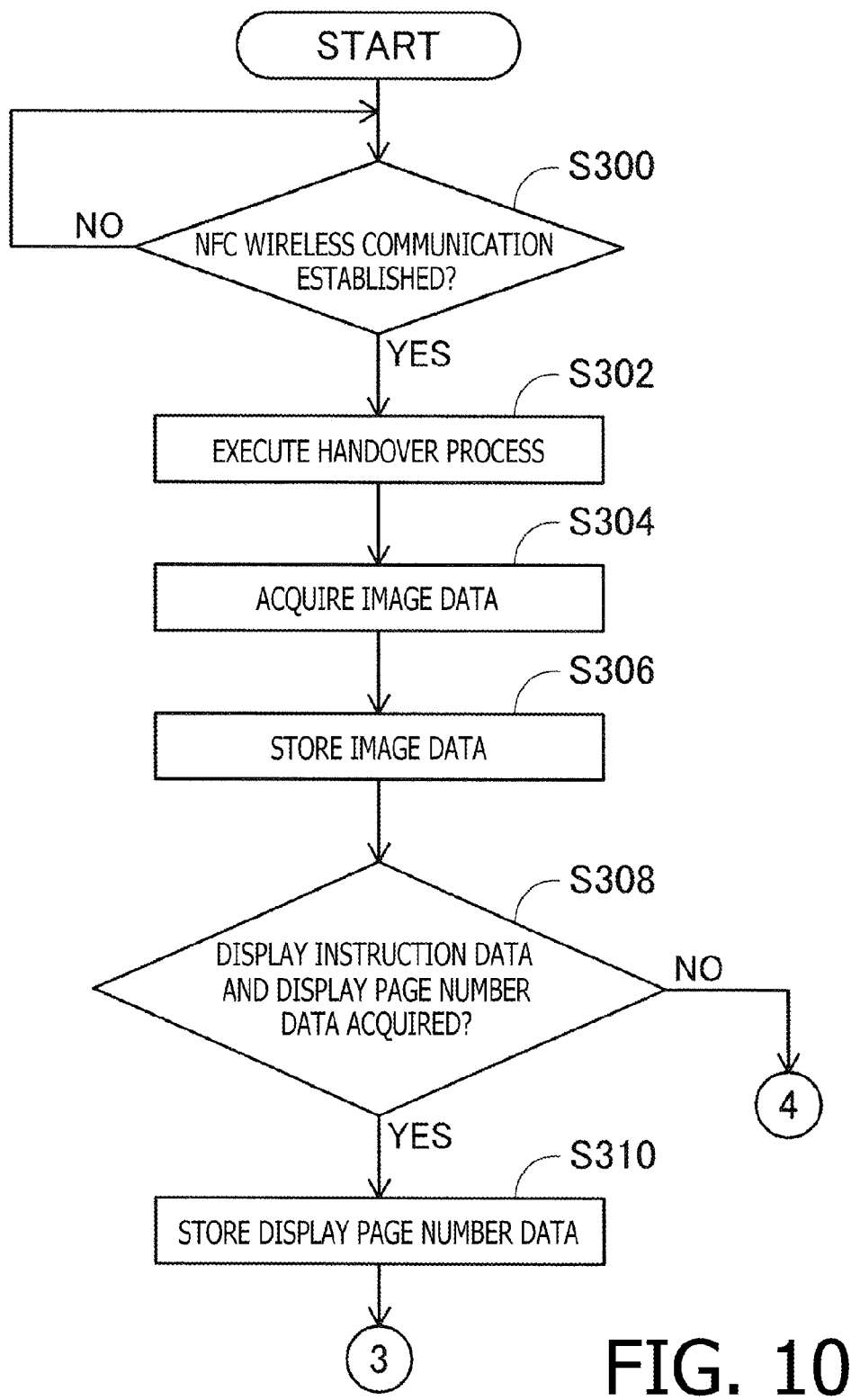
FIGS. 10 and 11 show a flowchart illustrating an operation of the MFP according to the second embodiment of the invention.
Figure 11:
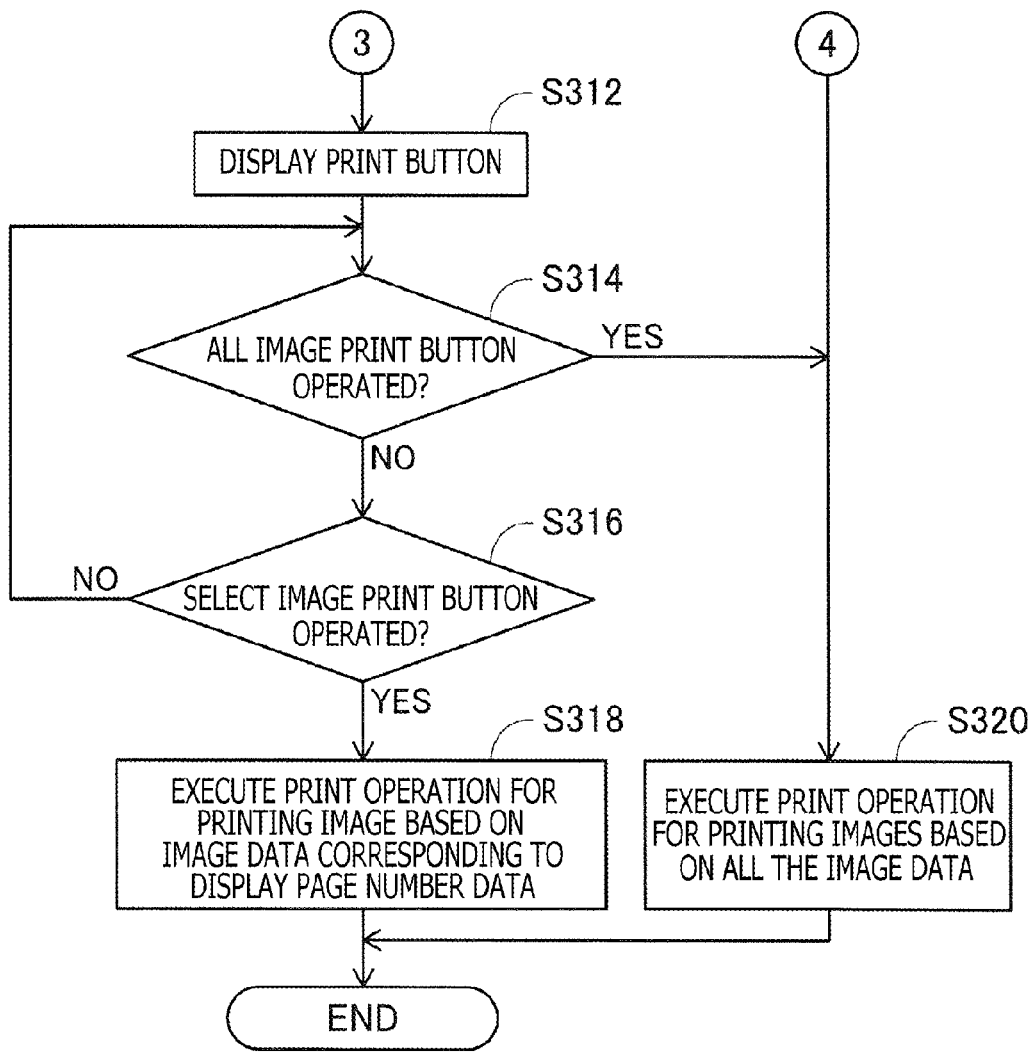
Figure 12:
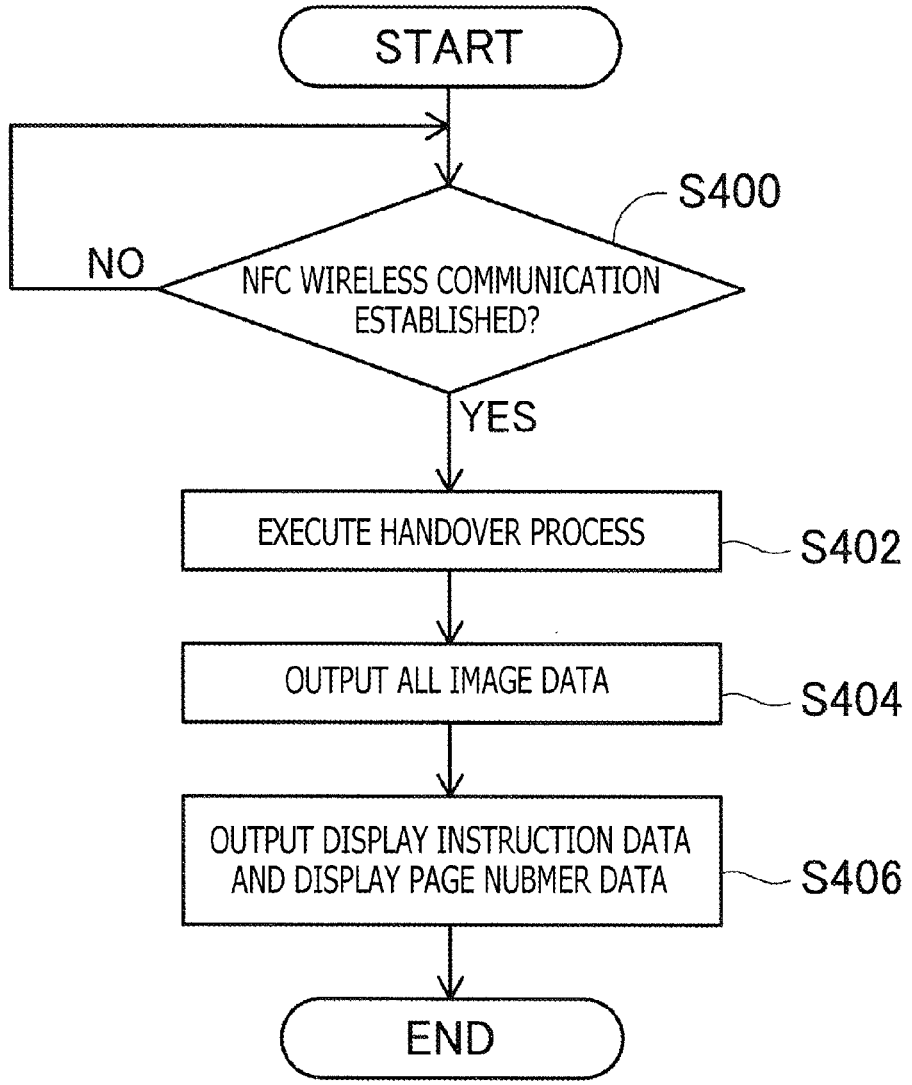
FIG. 12 shows a flowchart illustrating an operation of the mobile phone according to second embodiment of the invention.

A detailed flow illustrating the second embodiment will be described with reference to FIGS. 10-12. Firstly, referring to FIGS. 10 and 11, the print process of the MFP 50 according to the second embodiment will be described in detail. In S300, the CPU 52 judges whether the NFC wireless communication 92 is established. If the NFC wireless communication 92 is not established (S300: NO), step S300 is repeated. If the NFC wireless communication is established (S300: YES), the CPU 52 proceeds to S302. In S302, the CPU 52 executes the handover process described above. Then, the CPU 52 proceeds to S304.

In S304, the CPU 52 obtains, via the OS 74b, the data which is generated as the image data is received via the WFD wireless communication 90, and proceeds to S306. In S306, the CPU 52 stores the obtained image data in the storage unit 54. That is, the CPU 52 outputs the data causing the MFP 50 to store the obtained image data in the storage unit 54 via the OS 74b. Then, the CPU 52 proceeds to S308.

In S308, the CPU 52 judges whether the display instruction data and the display page number data have been obtained. Specifically, the CPU 52 judges whether the data, which is generated as the display instruction data and the display page number data are obtained via the WFD wireless communication, is obtained via the OS 74b. If the display instruction data and the display page number data have not been obtained (S308: NO), the CPU 52 proceeds to S320.

If the display instruction data and display page number data have been obtained (S308: YES), the CPU 52 proceeds to S310. In S310, the CPU 52 stores the display page number data in the storage unit 54. That is, the CPU 52 outputs data causing the storage unit 54 to store the obtained display page number data via the OS 74b. Then, the CPU 52 proceeds to S312. In S312, the CPU 52 outputs image data for displaying the print button 110 and 112 on the panel 56 via the OS 74b. Then, the CPU 52 proceeds to S314.

In S314, the CPU 52 judges whether the all image print button 112 is operated. That is, the CPU 52 judges whether the data, which is generated in response to the user operation of the all image print button 112, is received via the OS 74b. If the all image print button 112 has been operated (S314: YES), the CPU 52 proceeds to S320.

In S320, the CPU 52 executes the print process to print images based on all the image data stored in the storage unit 54. That is, the CPU 52 outputs, via the OS 74b, data causing the printer 60 to print images based on all the image data stored in the storage unit 54. Then, the print process program 74 is terminated.

If the all image print button 112 has not been operated (S314: NO), the CPU 52 proceeds to S316. In S316, the CPU 52 judges whether the display image print button 110 has been operated. That is, the CPU 52 judges whether data that is generated in response to the user operation of the display image print button n110 is received via the OS 74b. If the display image print button 110 has been not operated (S316: NO), the CPU 52 returns to S314. If the display image print button 110 has been operated (S316: YES), the CPU 52 proceeds to S318.

In S318, the CPU 52 executes the print process of the images represented by the image data based on the display page number data. That is, the CPU 52 outputs, via the OS 74b, data for extracting the image data identified by the display page number data from among all the image data stored in the storage unit 54. Then, the CPU 52 outputs, via the OS 74b, data causing the printer 60 to execute the print process of the image based on the extracted image data. Thereafter, the CPU 52 terminates the print process program 74a.

Next, referring to FIG. 12, execution of the print process on the mobile phone 10 will be described. In S400, the CPU 12 judges whether the NFC wireless communication 92 is established. If the NFC wireless communication 92 has not been establishes (S400: NO), step S400 is repeated. If the NFC wireless communication 92 has been established (S400: YES), the CPU 12 executes the handover process as mentioned above, and proceeds to S404.

In S404, the CPU 12 transmits all the image data, including the image data of the image 100 displayed on the panel 22, of the contents data to the MFP 50 via the WFD wireless communication 90. That is, the CPU 12 outputs, via the OS 32b, all the image data of the contents data including the image data of the image 100 currently displayed on the panel 22, so that the wireless LAN I/F 18 can transmit the same to the wireless LAN I/F 68 of the MFP 50 via the WFD wireless communication 90. Then, the CPU 12 proceeds to S406.

In S406, the CPU 12 outputs, via the OS 32b, the display instruction data and the display page number data so that the wireless LAN I/F 18 transmits the same to the wireless LAN I/F 78 of the MFP 50 via the WFD wireless communication. That is, the CPU 12 transmits instruction data instructing to display the print buttons 110 and 112 on the panel 56, and data which identifies the image data, from among all the image data included in the contents data, of the image 100 displayed on the panel 22.

Modification

Figure 13:
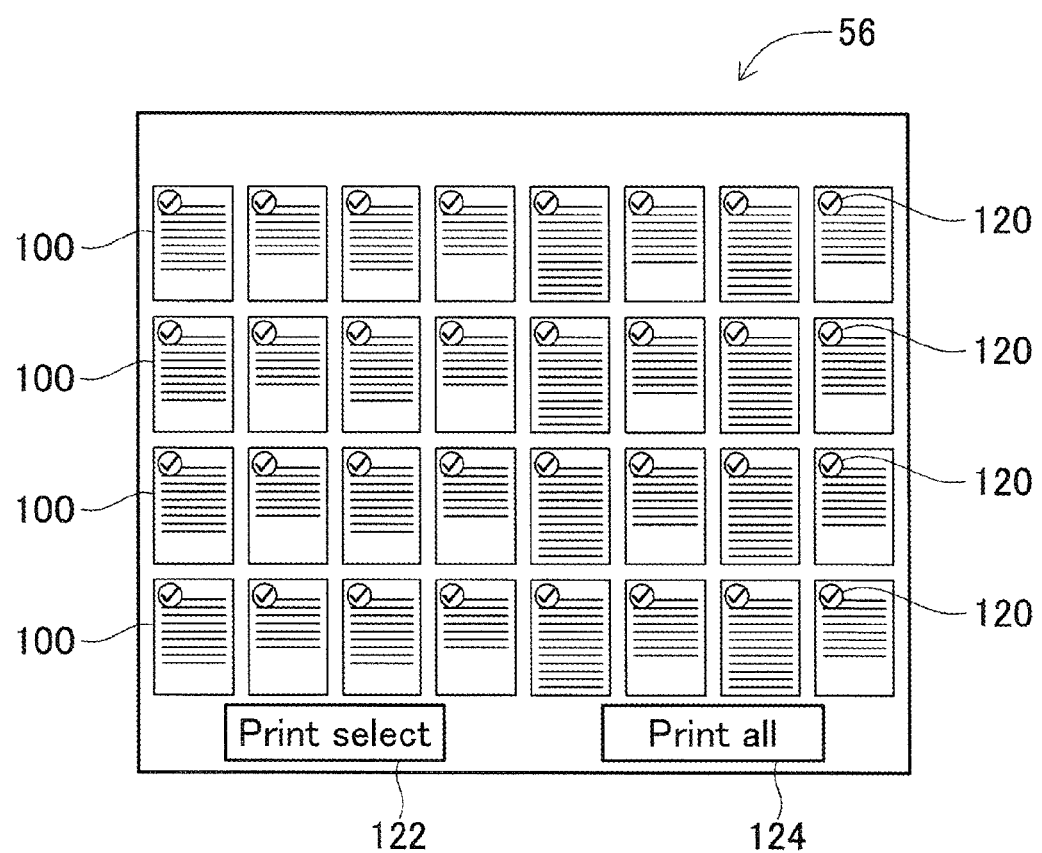
FIG. 13 shows an example when an image is displayed on the panel of an MFP according to a modified embodiment of the invention.

According to the exemplary embodiments, printing of one image 100 displayed on the panel 22 of the mobile phone 10 or printing of images based on all the image data included in the contents data can be selected. It is possible to modify the embodiments such that a plurality of desired images is printed. Specifically, according to such a modification, after the mobile phone 10 transmits the display instruction data, all the image data included in a predetermined range of contents data which includes the image data of the image 100 displayed on the panel 22 of the mobile phone 10 is transmitted to the MFP 50 (M210). In the MFP 50, in accordance with the display instruction data transmitted from the mobile phone 10, a plurality of images included in the contents data is displayed in a form of thumbnail on the panel 56 of the MFP 50 as shown in FIG. 13 (M214).

On an upper portion of each of the plurality of images 100, a check area (circle) 120 is provided. The check area 120 is for indicating whether the image 100 on which the check area 120 is provided is selected by the user or not. The check area 120 is checked when the user taps the image 100. That is, the image 100 of which the check area 120 is checked is the image 100 selected by the user. The user can select a plurality of desired images 100. Further, on the lower part of the panel 56, a select image print button 122 and all image print button 124 are displayed. The select image print button 122 is for printing the images 100 selected by the user, while the all image print button 124 is, similar to the all image print button 112, for printing images based on all the image data included in the contents data.

In the MFP 50 according to the embodiments, the print buttons 110 and 112 are displayed on the panel 56 in accordance with the display instruction data. This configuration can be modified such that operation buttons (mechanical buttons) of the MFP 50 may be configured to function as the print buttons. Specifically, when a first predetermined button is operated, the MFP 50 may execute the same process as a case where the display image print button 110 is operated, while when a second predetermined button is operated, the MFP 50 may execute the same process as a case where the all image print button 112 is operated.

In the embodiments, if the MFP 50 does not receive the display instruction data, the printing operation is applied to images based on all the pieces of received image data. Optionally, as a secondary process, such a configuration may be modified such that print process is performed for images based on part of the received image data (i.e., part of all the pieces of image data). In such a modified configuration, selection of images data subject to print from all the pieces of image data as received may be done by the user, or may be automatically done based on conditions set to the MFP 50 in advance. Alternatively, when the MFP 50 does not receive the display instruction data, as a secondary process, an error indicating screen may be displayed and printing may not be executed. Further alternatively, when the MFP 50 does not receive the display instruction data, the secondary process as above may not be executed. In such a case, when the MFP 50 does not receive the display instruction data, not process may be executed.

Figure 4:
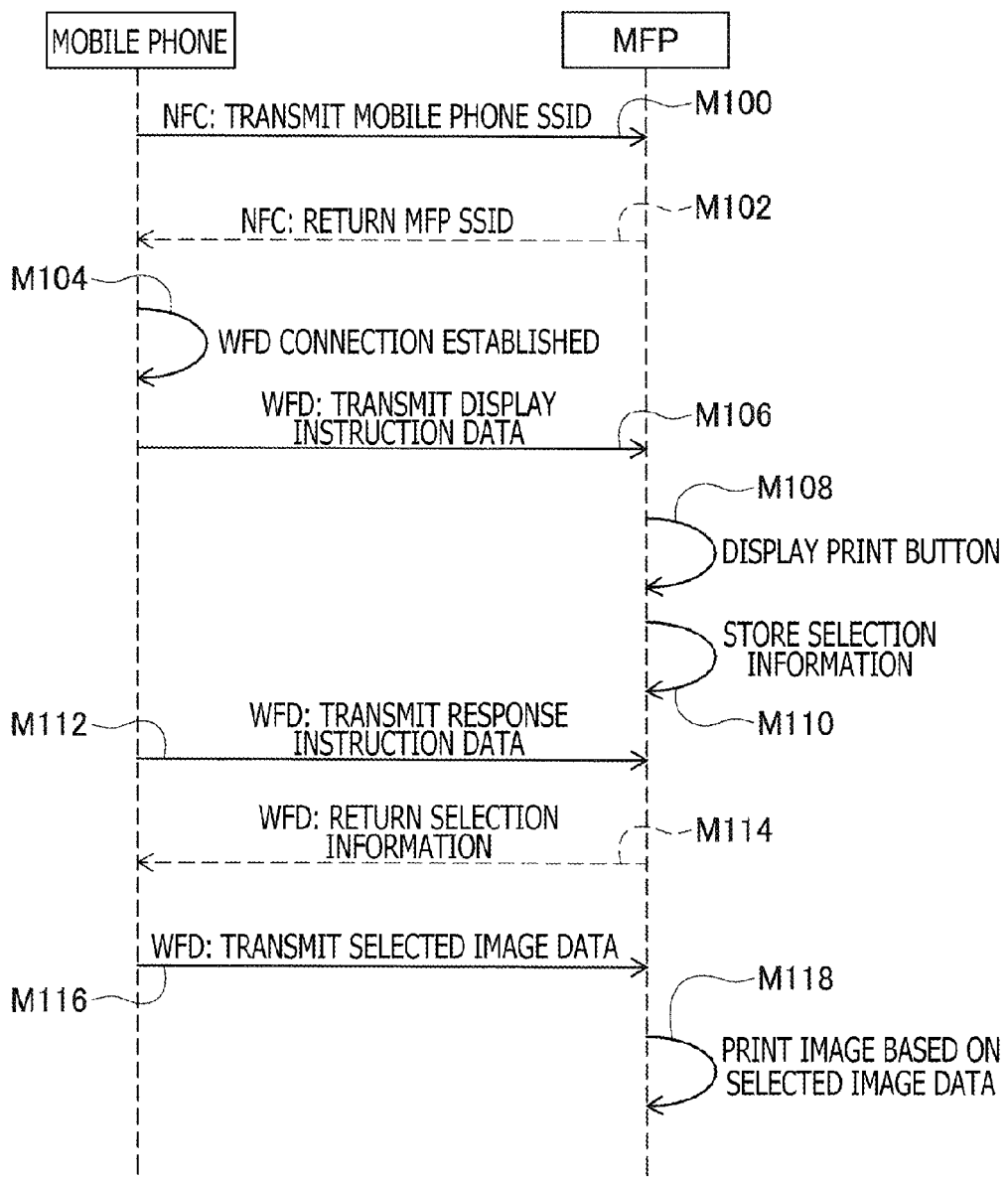
FIG. 4 is a sequence chart illustrating a printing process is executed in the communication system according to the first embodiment of the invention.
Figure 5:
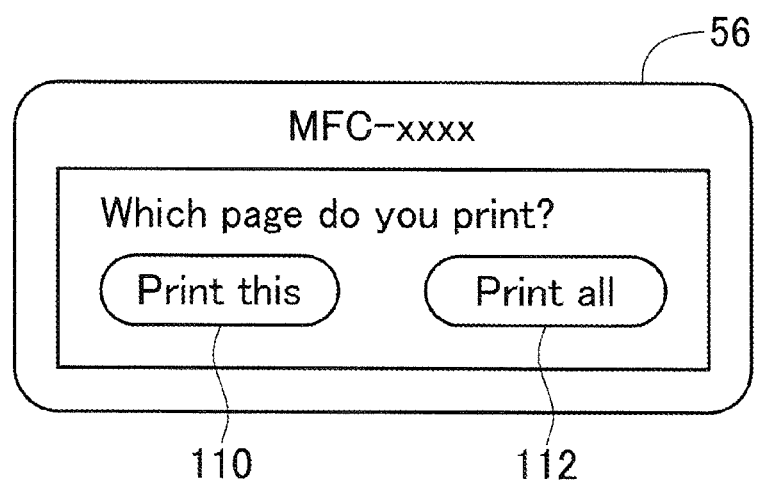
FIG. 5 shows an example when an image is displayed on the panel of the MFP according to the first embodiment of the invention.

According to the embodiments, the MFP 50 is configured such that, when the response instruction data causing the MFP 50 to transmits the selection information stored in the storage unit 54 to the mobile phone 10 is received from the mobile phone 10 (FIG. 4: M112), the selection information is transmitted to the mobile phone 10 via the WFD wireless communication 90 (FIG. 4: M114).

The above configuration can be modified such that, when the MFP 50 does not receive the response instruction data from the mobile phone 10, the selection information is transmitted to the mobile phone 10 via the WFD wireless communication 90. That is, the MFP 50 may be configured such that, after the selection information is stored (FIG. 4: M110), the stored selection information may be transmitted to the mobile phone 10 via the WFD wireless communication 90.

The print application 32a (FIGS. 6 and 7) may be modified such that, if the print buttons 110 and 112 are displayed on the panel 56 (S106) and no user operation is made for a predetermined period, data requesting for the image data of the image 100 currently displayed on the panel 22 of the mobile phone 10 may be transmitted to the mobile phone 10 via the WDF wireless communication 90.

Figure 8:
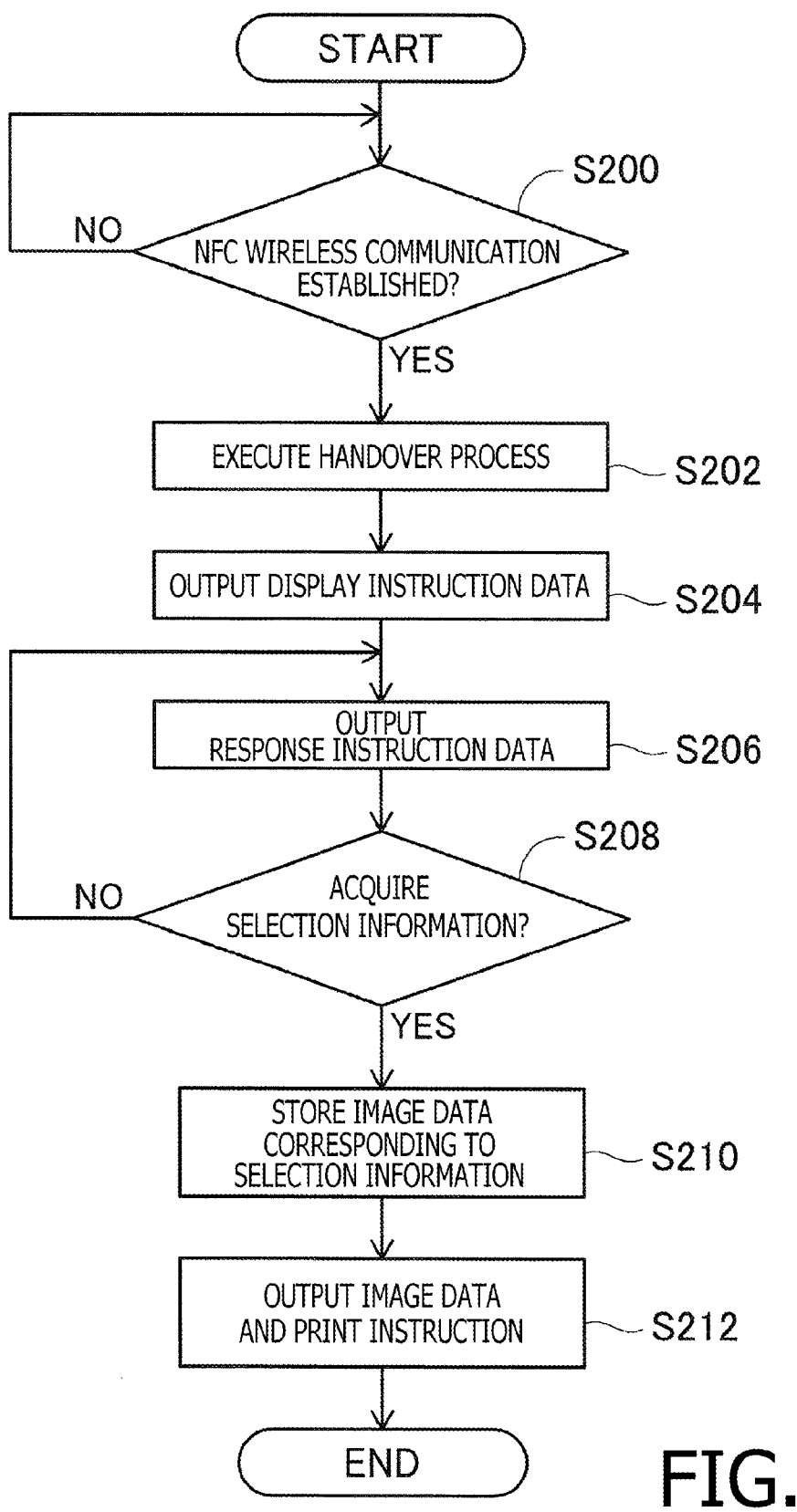
FIG. 8 shows a flowchart illustrating an operation of the mobile phone according to the first embodiment of the invention.

The process shown in FIG. 8 may be modified such that, when the instruction data for displaying the print buttons 110 and 112 on the panel 56 of the MFP 10 is transmitted from the mobile phone 10 to the MFP 50 via the WFD wireless communication 90 (S206), image data of the image 100 displayed on the panel 22 of the mobile phone 10 may also be transmitted to the MFP 50. In such a case, since the MFP 50 receives the image data and the instruction data, the print buttons 110 and 112 may be displayed together with the image 100 on the panel 56 of the MFP 50.

A mobile terminal that transmits the display instruction data to the MFP 50 could be a tablet terminal, a smart phone, and the like, and the mobile terminal needs not be limited to the mobile phone 10.

A device which displays the print button 100 and the like in accordance with the display instruction data and enable the user to select images is not limited to the MFP 50, and other printable devices may be used instead.

According to the exemplary embodiments, as a close-range communication, the NFC wireless communication is employed. It is noted that TransferJet (registered trademark) wireless communication may be employed instead of the NFC wireless communication. In such a case, as a wireless communication to be established with the handover process could be one of various types of wireless communications. Further, the wireless communication to be established with the handover process could be one of various methods having a longer communicatable range than the TransferJet wireless communication. Alternatively, the image information and the like may be transmitted via the TransferJet wireless communication, without executing the handover process.

In the exemplary embodiments, the CPU 12 of the mobile phone 10 and the CPU 52 of the MFP 50 execute the print application 32*a* and the print process program 74*a* and executed various operations, respectively. However, the invention needs not be limited to such a configuration. For example, the CPU 12, which executes the print application 32*a*, may transmit various instructions to the OS 32*b* and other system/hardware configurations. Further, the CPU 52, which executes the print process program 74*a*, may transmit various instructions to the O574*b* and other system/hardware configurations.

In the exemplary embodiments, as the CPU 52 executes the print process program 74*a*, the process shown in FIGS. 6 and 7 is executed. In this process shown in FIGS. 6 and 7, steps S100, S103, S106, S112 and S114 may be omitted. In such a modification, when the display instruction data is received (S104: YES), the CPU 52 proceeds to S108, while the display instruction has not been received (S104: NO), the CPU 52 proceeds to S116. Further, after the selection information is stored (S110), the CPU 52 proceeds to S116. It is noted that the modification may include a case where one or some of the steps of steps S100, S103, S106, S112 and S114 are omitted.

In the exemplary embodiment, as the CPU 12 executes the print application 32*a*, the process shown in FIG. 8 is executed. In this process shown in FIG. 8, steps S200, S202, and S206-S210 may be omitted. It is noted that the modification may include a case where one or some of the steps of steps S200, S202, and S206-S210 are omitted.

Technical configurations described in the specification and shown in drawings may achieve technical effectiveness solely or by various combinations thereof, and should not be limited to configurations set forth in the claims as originally filed. Further, the techniques disclosed or suggested in the specification and drawings may achieve a plurality of objects, while achieving even one of such objects may have technical effectiveness.

Each program exemplified in the aforementioned embodiment may include only a single program module, or may include a plurality of program modules. Each configuration exemplified in the aforementioned embodiment may be a replaceable different configuration. Aspects of the present invention may be achieved by, as well as the CPU 12 or 52 executing the print application 32*a* or the print process program 74*a*, various configurations such as a computer executing a program (e.g., an operating system, an application, or a program) other than the print application 32*a* or the print process program 74*a*, a hardware element (e.g., the panel 22 or 56) operating in accordance with instructions from a computer, a configuration of a computer and a hardware element that operate in collaboration with each other, a computer executing a plurality of programs in collaboration with each other, and a hardware configuration that operates in accordance with instructions from a computer executing a plurality of programs in collaboration with each other.

What is claimed is:

1. A printing device, comprising:
   a panel configured to display an image;
   a printing device side wireless communication unit configured to execute wireless communication with a mobile terminal;
   an operation acquisition unit configured to acquire user operation on an image displayed on the panel; and
   a processor, wherein the processor is configured to, in response to establishing the wireless communication with the mobile terminal:
     acquire instruction information via the printing device side communication unit from the mobile terminal;
     acquire, from the mobile terminal, one piece of image information from among a plurality of pieces of image information included in an image information set; and
     display a selection screen on the panel, the selection screen including at least a first selection button corresponding to the one piece of the image information and a second selection button corresponding to all of the plurality of pieces of image information,
   wherein the printing device side wireless communication unit includes a near field communication unit configured to execute a near field communication with the mobile terminal, and a long distance wireless communication unit configured to execute a long distance wireless communication having a communicatable distance longer than a communicatable distance of the near field communication,
   wherein the long distance wireless communication unit establishes a long distance communication with the mobile terminal based on long distance related information which is related to the long distance wireless communication transmitted from the mobile terminal via the near field communication when the near field communication was established,
   wherein the processor is further configured to
     acquire information, which is generated by the operation acquisition unit in response to acquisition of a user operation on one of the first selection button and the second selection button included in the selection screen displayed on the panel, as selection information which is used to identify image information selected by the user;
     in response to acquisition of the instruction information, execute a first print process to print an image based on the image information which is identified by the selection information;
     acquire the instruction information via the near field communication, from the mobile terminal when the near field communication is established between the printing device and the mobile terminal; and
     obtain at least one piece of image information included in the image information set transmitted by the mobile terminal, which is a transmission source of the instruction information, as received after the instruction information is acquired via the near field communication, and the long distance wireless communication is established.

2. The printing device according to claim 1, wherein the processor is configured to execute a second print process which is different from the first print process when the processor has not acquired the instruction information.

3. The printing device according to claim 1,
wherein the processor is configured to:
- output the image information in response to acquisition of the instruction information, and execute the first print process to print an image based on the image information identified by the selection information as acquired after outputting the image information.

4. The printing device according to claim 1, wherein the processor is further configured to execute a second print process based on the at least one piece of image information without acquiring the selection information if the instruction information is not acquired.

5. The printing device according to claim 4, wherein the print process is executed based on all the image information if the instruction information is not acquired.

6. The printing device according to claim 1, wherein the processor is configured to:
- transmit request information which requests the mobile terminal to transmit desired image information indicated by the selection information via the long distance wireless communication;
- obtain the instruction information via the near field communication unit when the near field communication is established;
- transmit request information requesting the mobile terminal to transmit image information identified by the selection information via the long distance wireless communication after the long distance wireless communication is established; and
- process images based on the image information which was transmitted, via the long distance wireless communication, from the mobile terminal in response to the request information.

7. A printing device comprising:
a panel configured to display an image;
a printing device side wireless communication unit configured to execute wireless communication with a mobile terminal;
an operation acquisition unit configured to acquire user operation on an image displayed on the panel; and
a processor, wherein the processor is configured to, in response to establishing the wireless communication with the mobile terminal:
- acquire instruction information via the printing device side communication unit from the mobile terminal;
- acquire, from the mobile terminal, one piece of image information from among a plurality of pieces of image information included in an image information set; and
- display a selection screen on the panel, the selection screen including at least a first selection button corresponding to the one piece of the image information and a second selection button corresponding to all of the plurality of pieces of image information,
wherein the processor is configured to:
- acquire information, which is generated by the operation acquisition unit in response to acquisition of a user operation on one of the first selection button and the second selection button included in the selection screen displayed on the panel, as selection information which is used to identify image information selected by the user;
- in response to acquisition of the instruction information, execute a first print process to print an image based on the image information which is identified by the selection information
- when the acquired instruction information includes related information which is related to a predetermined image information of a plurality of pieces of image information included in the image information set, obtain information which is generated as the operation acquisition unit acquires a user operation as selection information to identify image information to which the related information is related; and
- when the acquired instruction information includes related information which is related to the predetermined image information of a plurality of pieces of image information included in the image information set:
  - if the selection information is acquired, execute the first print process, while, if the selection information is not acquired, execute a second print process which is different from the first print process.

8. The printing device according to claim 7, wherein the processor is configured to:
- cause the printing device side wireless communication device to transmit request information which requests the mobile terminal to transmit the image information; and
- in response to acquisition of the instruction information, execute the first print process by printing an image based on the image information which is acquired after causing the printing device side wireless communication unit to transmit the request information.

9. The printing device according to claim 7, wherein the processor is configured to:
- acquire the plurality of pieces of image information included in the image information set via the wireless communication; and
- acquire information, which is generated by the operation acquisition unit in response to acquisition of a user operation on the second selection button after the instruction information is acquired and the plurality of pieces of image information are acquired, as selection information identifying a piece of image information selected by the user.

10. A non-transitory computer readable recording medium storing instructions to be executed by a processor of a printing device, the printing device comprising a panel configured to display an image, a printing device side wireless communication unit configured to execute wireless communication with a mobile terminal and an operation acquisition unit configured to acquire user operation on an image displayed on the panel, wherein the printing device side wireless communication unit includes a near field communication unit configured to execute a near field communication with the mobile terminal, and a long distance wireless communication unit configured to execute a long distance wireless communication having a communicatable distance longer than a communicatable distance of the near field communication, the long distance wireless communication unit establishing a long distance communication with the mobile terminal based on long distance related information which is related to the long distance wireless communication transmitted from the mobile terminal via the near field communication when the near field communication was established,
the instructions, when executed, causing the processor to, in response to establishing the wireless communication with the mobile terminal:
- acquire instruction information via the printing device side communication unit from the mobile terminal;

acquire, from the mobile terminal, at least one piece of image information from among a plurality of pieces of image information included in an image information set; and display a selection screen on the panel, the selection screen including at least a first selection button corresponding to the one piece of the image information and a second selection button corresponding to all of the plurality of pieces of image information, the instructions, when executed, further causing the processor to:

acquire information, which is generated by the operation acquisition unit in response to acquisition of a user operation on one of the first selection button and the second selection button included in the selection screen displayed on the panel, as selection information which is used to identify image information selected by the user;

in response to acquisition of the instruction information, execute a print process to print an image based on the image information which is identified by the selection information;

acquire the instruction information via the near field communication, from the mobile terminal when the near field communication is established between the printing device and the mobile terminal; and obtain at least one piece of image information included in the image information set transmitted by the mobile terminal, which is a transmission source of the instruction information, as received after the instruction information is acquired via the near field communication, and the long distance wireless communication is established.

* * * * *